US012680366B2

(12) United States Patent
Kern

(10) Patent No.: US 12,680,366 B2
(45) Date of Patent: Jul. 14, 2026

(54) SLIDING SYSTEM WITH IMPROVED MECHANISMS

(71) Applicant: Goldbrecht LLC, Paramount, CA (US)

(72) Inventor: Thomas Kern, Culver City, CA (US)

(73) Assignee: GOLDBRECHT LLC, Paramount, CA (US)

( * ) Notice: Subject to any disclaimer, the term of this patent is extended or adjusted under 35 U.S.C. 154(b) by 42 days.

(21) Appl. No.: 18/415,239

(22) Filed: Jan. 17, 2024

(65) Prior Publication Data

US 2025/0230694 A1 Jul. 17, 2025

(51) Int. Cl.
*E05F 15/643* (2015.01)
*E05D 15/06* (2006.01)

(52) U.S. Cl.
CPC ........ *E05F 15/643* (2015.01); *E05D 15/0691* (2013.01)

(58) Field of Classification Search
CPC ............ E05D 15/0665; E05D 15/0652; E05D 15/0686; E05D 15/06; E05D 15/0626; E05D 15/063; E05D 15/0643; E05D 15/0647; E05F 15/643; E05F 7/005
See application file for complete search history.

(56) References Cited

U.S. PATENT DOCUMENTS 4,452,014 A * 6/1984 Markus ................. E05F 15/646 49/210
4,680,828 A * 7/1987 Cook .................. E05D 15/1021 16/102
8,904,712 B2 * 12/2014 Gosling .................. E06B 1/526 49/427
10,012,017 B2 * 7/2018 Angebault .............. E05D 15/08
10,626,648 B2 * 4/2020 Sakabe ................. E06B 3/4645
11,242,707 B2 * 2/2022 Mareaux ............. E05D 15/0617
11,299,887 B2 * 4/2022 Pylypczak .............. E04B 2/825
11,680,438 B2 * 6/2023 Fontijn ............... E05D 15/0686 52/217
11,713,607 B2 * 8/2023 Fontijn ............... E05D 15/0656 49/425
11,781,370 B2 * 10/2023 Fontijn ................. E06B 3/4609 49/468
2004/0074046 A1 * 4/2004 Mimnaugh ........... E05D 15/063 16/96 R
2016/0265259 A1 * 9/2016 Angebault .......... E05D 15/0686
2018/0216394 A1 * 8/2018 Mareaux ............. E05D 15/0617
2019/0226257 A1 * 7/2019 Fontijn ............... E05D 15/0665
2022/0389753 A1 * 12/2022 Fontijn ............... E06B 3/26347
2025/0067102 A1 * 2/2025 Pfeuti ................... E05D 15/063

FOREIGN PATENT DOCUMENTS

WO WO-2023110169 A1 * 6/2023 ............. E05D 13/10

* cited by examiner

*Primary Examiner* — Justin B Rephann
(74) *Attorney, Agent, or Firm* — Sughrue Mion, PLLC

(57) ABSTRACT

Example embodiments provide a sliding system with improved mechanisms. According to embodiments, the sliding system may include a drive mechanism, a frame, a supporting device, and a connecting device. The drive mechanism is configurable to move a sliding panel along at least one track. The frame may house at least a portion of the drive mechanism. The supporting device may be detachably connected to the frame. The connecting device detachably connected the drive mechanism to the sliding panel.

15 Claims, 8 Drawing Sheets

SLIDING SYSTEM WITH IMPROVED MECHANISMS

BACKGROUND

1. Field

Exemplary embodiments of the present disclosure relate to a sliding system, and more particularly, to a sliding system with improved mechanisms.

2. Descriptions of the Related Art

In related art motorized sliding systems, a drive mechanism (e.g., a belt, a chain, a wire, etc.) is attached to a sliding panel (e.g., a window panel, a door panel, etc.) and is utilized for moving the sliding panel along a track.

However, related art systems lack support for the drive mechanism, which may result in the sagging of the drive mechanism and misalignment between the sliding panel and the frame in which the drive mechanism is disposed. This in turn may lead to issues such as increases in force needed to move the sliding panel, damage to the sliding panel or the drive mechanism, poor weather sealing performance, and the like.

SUMMARY

Exemplary embodiments of the present disclosure provide a sliding system with improved mechanisms. Specifically, the sliding system of present disclosure includes devices for providing horizontal support for the drive mechanism and mitigating horizontal misalignment of components within the sliding system.

According to embodiments, the sliding system may include: a drive mechanism, a frame, a supporting device, and a connecting device. The drive mechanism is configurable to move a sliding panel along at least one track. The frame may house at least a portion of the drive mechanism. The supporting device may be detachably connected to the frame. The connecting device detachably connects the drive mechanism to the sliding panel. The sliding panel may include one of: a door panel and a window panel.

According to embodiments, the connecting device may include a first portion and a second portion. The first portion may be attached to the drive mechanism and the second portion may be attached to the sliding panel. The first portion is detachably connected to the second portion.

According to embodiments, the first portion may include at least one female connector portion and the second portion may include at least one male connector portion. Further, the first portion is movable in relation to the second portion when the connecting device is moved from a first position to a second position, and the connecting portion may have a first length at the first position and a second length at the second position. Furthermore, a portion of the first portion may be positioned between the frame and the supporting device.

According to embodiments, the frame may include a plurality of protruding portions, and the supporting device may include a receiving portion having a shape corresponding or conforming to the plurality of protruding portions of the frame. The supporting device may be detachably connected to the frame by inserting the plurality of protruding portions of the frame into the receiving portion of the supporting device.

According to embodiments, the drive mechanism may include a plurality of pulleys and a belt wrapped around the plurality of pulleys. At least one of the plurality of pulleys and at least a portion of the belt may be housed within the frame. Alternatively or additionally, at least one of the plurality of pulleys and at least a portion of the belt may be mounted on top of the frame. The first portion of the connecting device may be attached to the belt.

Additional aspects will be set forth in part in the description that follows and, in part, will be apparent from the description, or may be realized by practice of the presented embodiments of the disclosure.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Example embodiments of the present disclosure are described in detail below with reference to the drawings. The following detailed description of example implementations refers to the accompanying drawings. The same reference numbers in different drawings may identify the same or similar elements. The described embodiments are not to be construed as a limitation to the present disclosure.

In the following descriptions, some related embodiments describe a subset of all possible embodiments. However, it may be understood that the some embodiments may be the same subset or different subsets of all the possible embodiments, and may be combined with each other without conflict.

"Plurality of", as mentioned in the specification means two or more. "And/or" describes an association relationship for describing associated objects and represents that at least three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise.

The following description is added for similar description of "first/second" in this application. In the following description, the terms "first/second/third" are merely intended to distinguish between similar objects rather than describing specific orders. It may be understood that, "first/second/third" is interchangeable in proper circumstances to enable some embodiments of this application to be implemented in other orders than those illustrated or described herein.

Unless otherwise defined, meanings of all technical and scientific terms used in this specification are the same as those usually understood by a person skilled in the art to which this application belongs. Terms used in the specification of this application are merely intended to describe objectives of the specific embodiments, but are not intended to limit this application.

Example embodiments of the present disclosure provide a sliding system with improved mechanisms. Specifically, the sliding system of example embodiments may include a supporting device that provides continuous horizontal support to the drive mechanism when the drive mechanism is moving during sliding operation. Further, the sliding system of example embodiments may also include a connecting device that connects the drive mechanism to a sliding panel, and allows vertical movement between the sliding panel and the frame housing the drive mechanism. Accordingly, the sliding system allows deflection of the components (e.g., sliding panel, etc.) and mitigates any horizontal misalignment therebetween.

Figure 1:
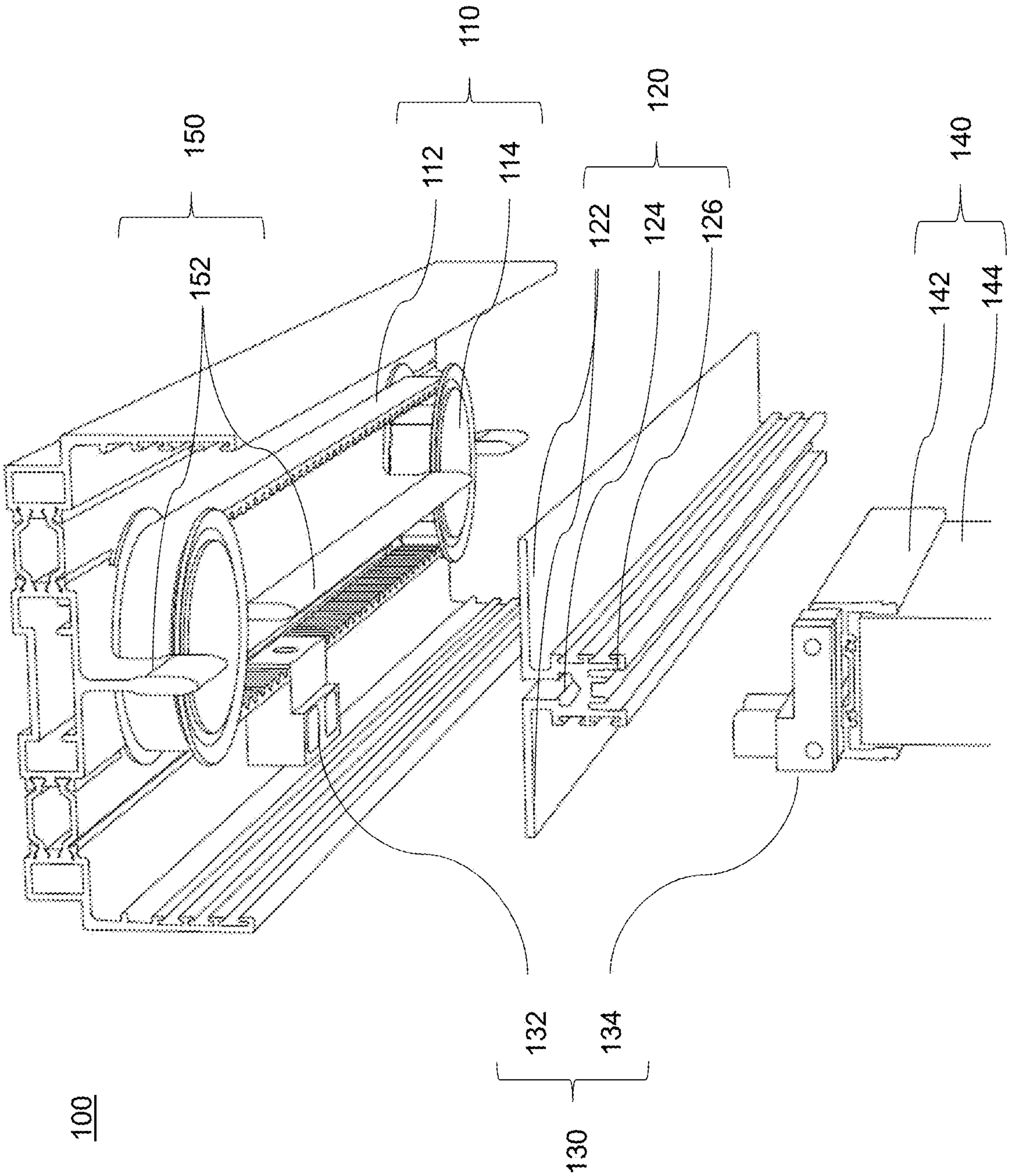
FIG. 1 illustrates an exploded perspective view of a sliding system, according to one or more embodiments.

FIG. 1 illustrates an exploded perspective view of a sliding system 100, according to one or more embodiments. Referring to FIG. 1, sliding system 100 may include a drive mechanism 110, a supporting device 120, a connecting device 130, a sliding panel 140, and a frame 150. One or more portions of the drive mechanism 110, the supporting device 120, the connecting device 130, the sliding panel 140, and/or the frame 150 may be made of plastic and/or metal. Descriptions of each of the components 110 to 150 are provided hereinbelow.

The drive mechanism n 110 may include one or more components communicatively/mechanically connected to a motorized system. The motorized system may include one or more electrical motors which, when rotated, provide rotational motion to the one or more components of the drive mechanism 110. The one or more components of the drive mechanism 110 may then convert the rotational motion of the motorized system into linear motion to thereby move or drive the sliding panel 140.

According to one or more embodiments, the sliding system 110 may include one or more parallel horizontal tracks (e.g., within the frame 150), and the drive mechanism 100 may be configured to provide sliding movement to move one or more sliding panels (e.g., the sliding panel 140) along the one or more tracks. Descriptions of example embodiments are provided below with reference to a two-track system, although it is contemplated that example embodiments of the present disclosure may also apply to any number of tracks (e.g., one-track, three-track, etc.), without departing from the scope of the present disclosure.

According to one or more embodiments, the drive mechanism 100 may include a belt 112 and a plurality of pulleys 114. The belt 112 may wrap around the plurality of pulleys 114 and may include a timing belt, a chain, a wire, and/or any other suitable component, which may move in response to a rotational movement of at least one of the plurality of pulleys 114. Specifically, at least one of the plurality of pulleys 114 may be connected or attached to a motor shaft of the motorized system and may transfer the rotational movement of the motor to the belt 112 when the motor is activated. The pulley that is connected to the motor shaft may be referred to as a "driver pulley", and may rotate clockwise to provide rotational movement in a first direction and may rotate in counterclockwise to provide rotational movement in a second direction.

Further, at least a portion of the drive mechanism 110 may be housed within the frame 150. For instance, in the example embodiments of FIG. 1 to FIG. 7, the belt 112 and the plurality of pulleys 114 are housed within the frame 150, and the belt 112 may rotate and return in separate tracks within the frame 150. In other example embodiments (e.g., embodiment in FIG. 8, etc.), a portion of the belt 112 and a portion of the pulleys 114 may be mounted on top of the frame 150 and the remaining portion of the belt 112 and the pulleys 114 may be housed within the frame 150. In this way, the belt 112 may rotate and return over the top of the frame 150.

The frame 150 may include a plurality of protruding portions 152. The plurality of protruding portions 152 may form a plurality of housing portions in which the plurality of pulleys 114 is positioned. The frame 150 may include, for example, a window frame, a door frame, and the like. The frame 150 may be installed in an upper portion (e.g., header, etc.) of an opening (e.g., a door opening, a window opening, etc.) of a building structure, in a lower portion (e.g., sill, etc.) of the opening, and/or in the side portion (e.g., jamb, etc.) of the opening, such that the sliding system of example embodiments described herein may be provided at the opening accordingly.

The supporting device 120 may be a plate elongated along the frame 150 and may be detachably connected to the frame 150, to thereby provide horizontal support to the drive mechanism 110 housed in and/or mounted to the frame 150. As illustrated in FIG. 1, the supporting device 120 may include at least two flat portions 122, a receiving portion 124 formed in between the at least two flat portions 122, and a protruding portion 126 formed below the at least two flat portions 122. According to embodiments, the supporting device 120 may also provide horizontal support to at least a portion of the connecting device 130 (related example configuration is illustrated in FIG. 4 to FIG. 8).

The receiving portion 124 may include an elongated channel or slot having a shape conforming or corresponding to the plurality of protruding portions 152 of the frame 150. For instance, the receiving portion 124 may interlock with the plurality of protruding portions 152 of the frame 150, when said protruding portions 152 are inserted to the receiving portion 124. Accordingly, the supporting device 120 is detachably connectable the frame 150 by inserting the plurality of protruding portions 152 of the frame 150 into the receiving portion 124 of the supporting device.

Figure 2:
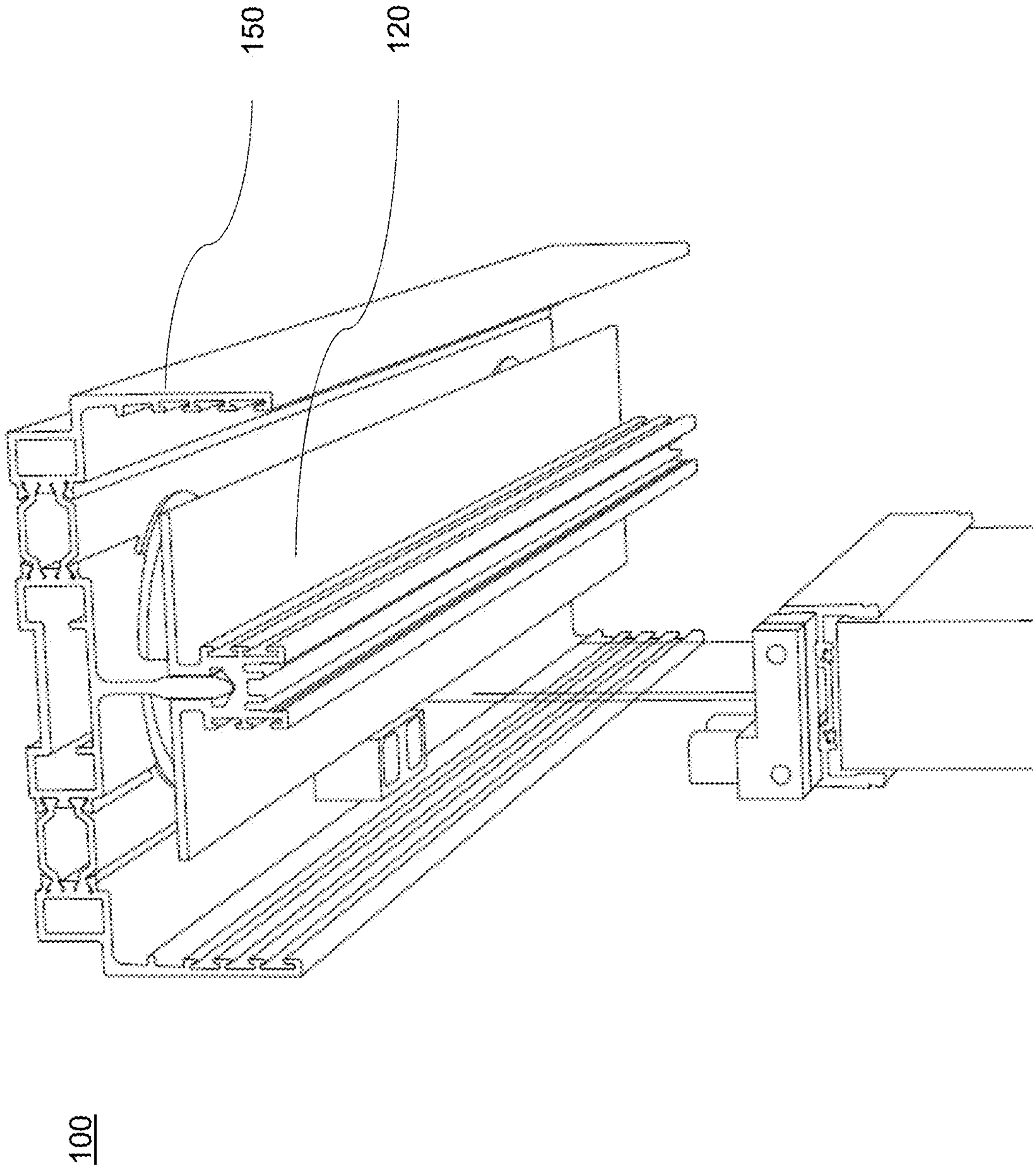
FIG. 2 illustrates a partially exploded perspective view of the sliding system, according to one or more embodiments.

FIG. 2 illustrates a partially exploded perspective view of the sliding system 100, according to one or more embodiments. Specifically, FIG. 2 shows a configuration of the sliding system 100, when the supporting device 120 is detachably connected to the frame 150. As illustrated in FIG. 2, upon connecting to the frame 120, the flat portions (i.e., flat portions 122 in FIG. 1) of the supporting device 120 may cover the drive mechanism (i.e., drive mechanism 110 in FIG. 1) housed within or mounted to the frame 150. In this way, the supporting device 120 may continuously support the drive mechanism, which in turn reduces negative effects such as drive mechanism sagging, misalignment, and the like, that occur in the related art.

Referring back to FIG. 1, the connecting device 130 may detachably connect the drive mechanism 110 to the sliding panel 140 to thereby enable the drive mechanism to drive or move the sliding panel 140. Specifically, the connecting device 130 may include a first portion 132 and a second portion 134. The first portion 132 may be attached to the drive mechanism 110 (e.g., the belt 112), and the second portion 134 may be attached to the sliding panel 140.

In the example embodiment in FIG. 1, the first portion 132 includes a plurality of receiving portions. The plurality of receiving portions may include a plurality of inserting slots or opening holes, each of which may have a shape conforming to a protruding portion of the second portion 134. On the other hand, the second portion 134 may include a plurality of protruding portions, each of which has a shape conforming to a receiving portion of the first portion 132. The first portion 132 may include a plurality of female connector portions, and the second portion 134 may include a plurality of male connector portions. The plurality of female connector portions is detachably connectable to the plurality of male connector portions. Accordingly, the first portion 132 is detachably connectable to the second portion 134 thereby forming the connecting device 130.

At least a portion of the first portion 132 may be supported by at least a portion of the supporting device 120. For instance, a portion of the first portion 132 that is attached to the belt 114 of the drive mechanism 110 may be positioned between the frame 150 and the supporting device 120, while a portion of the first portion 132 that is connectable to the second portion 134 (e.g., the plurality of receiving portions, the plurality of male connector portions, etc.) may not be covered by the supporting device 120. A related example configuration is illustrated in FIG. 4 to FIG. 8.

It is contemplated that, in other embodiments, the first portion 132 and the second portion 134 may have configurations different from the one illustrated in FIG. 1. For instance, the first portion 132 may include the plurality of protruding portions/male connector portions, and the second portion 134 may include the plurality of receiving portions/female connector portions, both the first portion and the second portion may include at least one protruding portion/male connector portion and at least one receiving portion/female connector portion, and the like, without departing from the scope of the present disclosure.

According to one or more embodiments, the sliding system 100 may include more than one connecting device 130. For instance, more than one first portion 132 may be attached to the belt 112 of the drive mechanism 110 along the length of the track in which the belt 112 is disposed, along the length of the supporting device 120, and/or along the length of the frame 150, and more than one second portion 134 may be attached to the sliding panel 140 along the length of the sliding panel 140. Alternatively, the first portion 132 and/or the second portion 134 may have lengths less than or equal to a length of the track in which the belt 112 is disposed, a length of the supporting device 120, a length of the frame 150, and/or a length of the sliding panel 140.

In operation, the first portion 132 may be movable in relation to the second portion 134. For instance, in response to a movement of the drive mechanism 110, the connecting device 130 may be moved from a first position to a second position, and during this operation, the first portion 132 and the second portion 134 may move toward each other or may move away from each other. Accordingly, the connecting device 130 may have a first length at the first position and may have a second length at the second position, wherein the first length and the second length are different. Descriptions of related features are provided below with reference to FIG. 5 to FIG. 7. In this way, the connecting device 130 may allow vertical movement between the sliding panel 140 and the frame 150, thereby allowing any deflection of the drive mechanism 110 and/or the sliding panel 140 during the sliding operation, and mitigating any possible misalignment between the sliding panel 140 and the frame 150 during the sliding operation.

The sliding panel 140 may include a substructure 142 and a panel 144. The substructure 142 may detachably connect to the second portion 134 of the connecting device 130 and the panel 144. According to embodiments, the substructure 142 may also movably contact the protruding portion 126 of the supporting device 120 and the frame 150 (related example configuration is illustrated in FIG. 5 to FIG. 8). The panel 144 may include a door panel, a window panel, and any other type of panel to which the sliding system 100 of the present disclosure may be applied.

Figure 3:
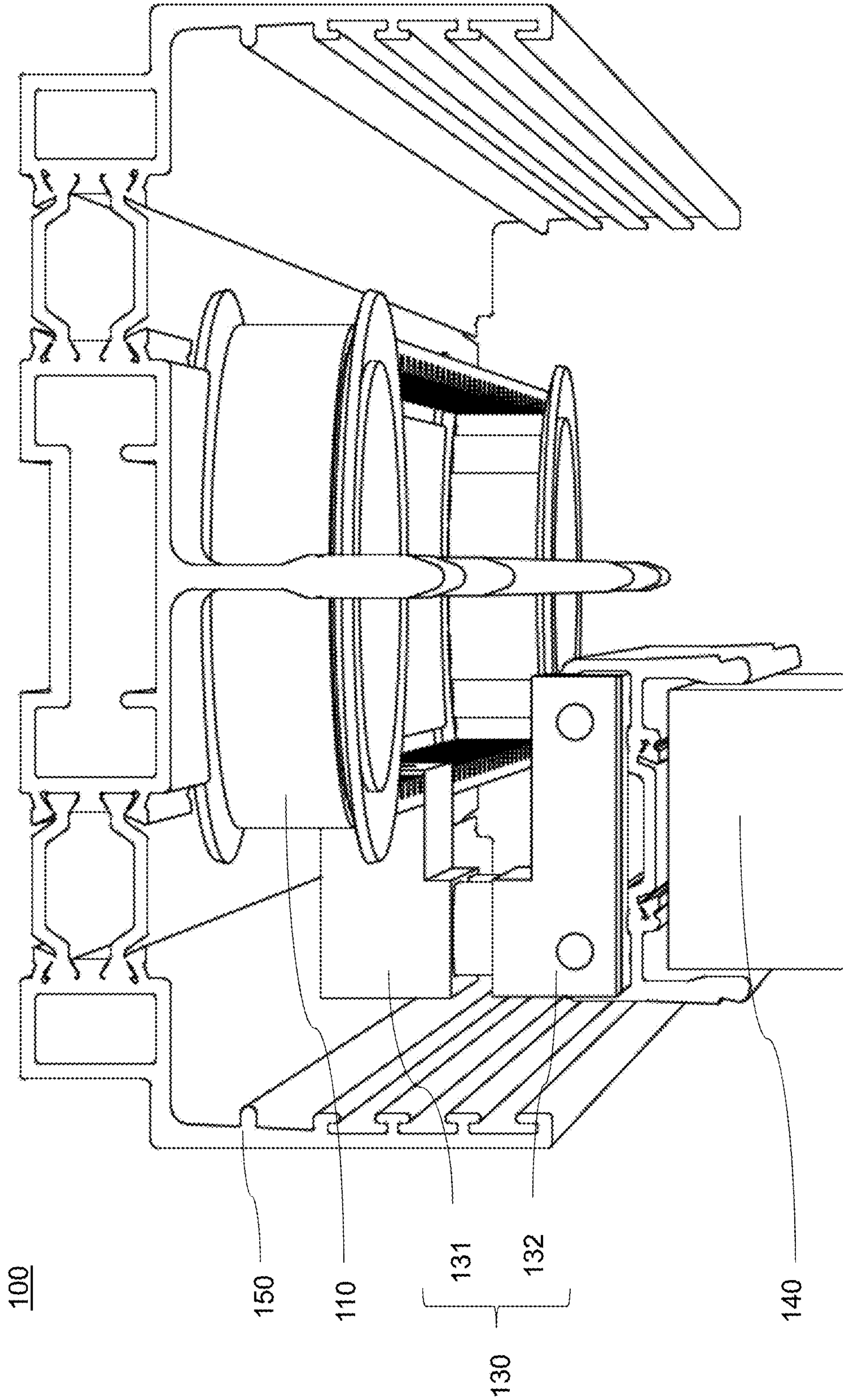
FIG. 3 illustrates a side view of the sliding system, according to one or more embodiments.
Figure 4:
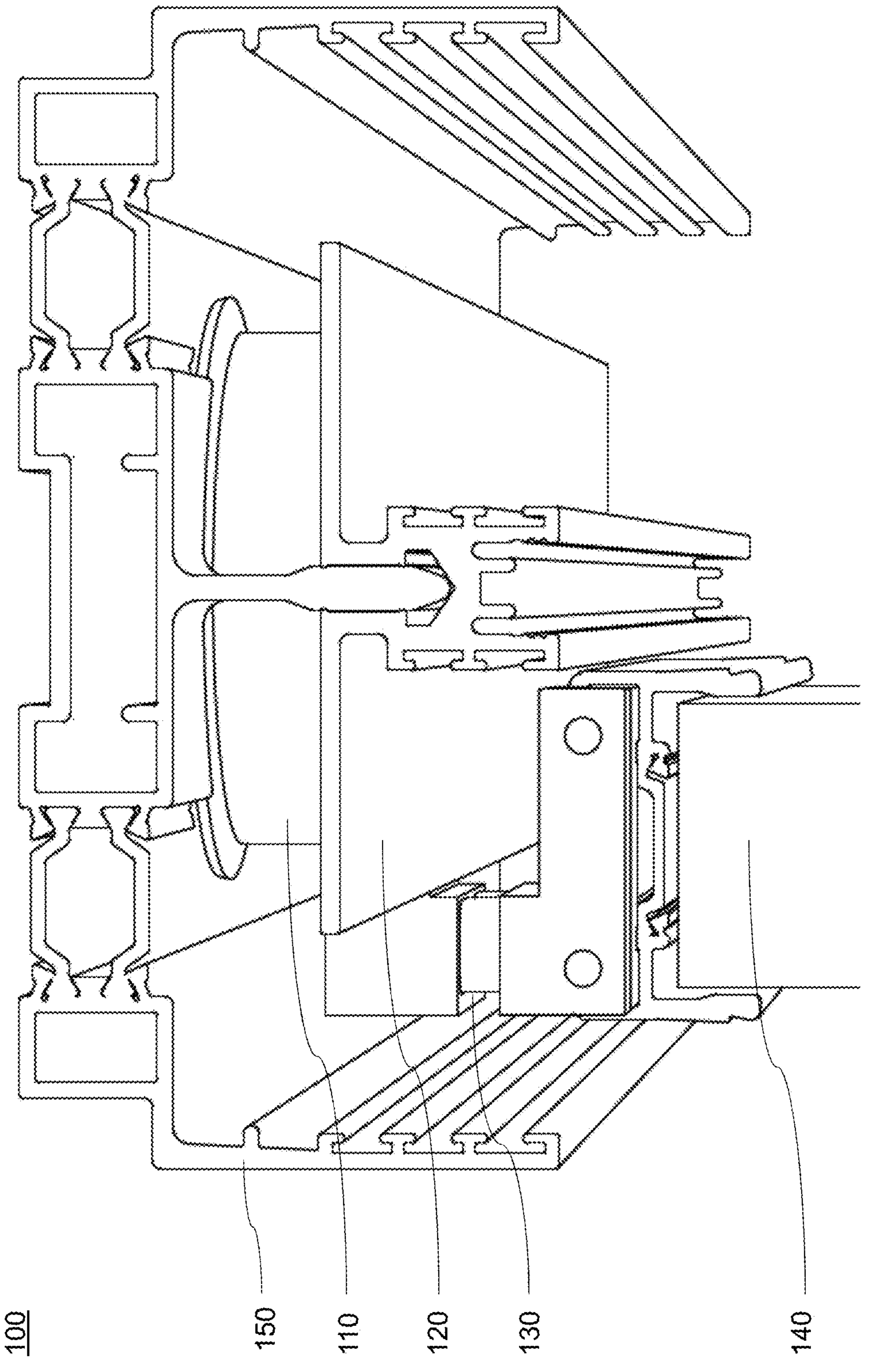
FIG. 4 illustrates another side view of the sliding system, according to one or more embodiments.

The components described above with reference to FIG. 1 may be assembled to form the sliding system 100 of the present disclosure. FIG. 3 illustrates a side view of the sliding system 100, according to one or more embodiments. Specifically, FIG. 3 shows a configuration in which the drive mechanism 110, the sliding panel 140, and the frame 150 are assembled, with the supporting device 120 omitted. FIG. 4 illustrates another side view of the sliding system 100, according to one or more embodiments. Specifically, FIG. 4 shows a configuration in which the drive mechanism 110, the supporting device 120, the sliding panel 140, and the frame 150 are assembled.

As described above, the connecting device 130 may move in operation thereby allowing vertical movement between the sliding panel 140 and the frame 150. These features are further described in the following with reference to FIG. 5 to FIG. 7.

Figure 5:
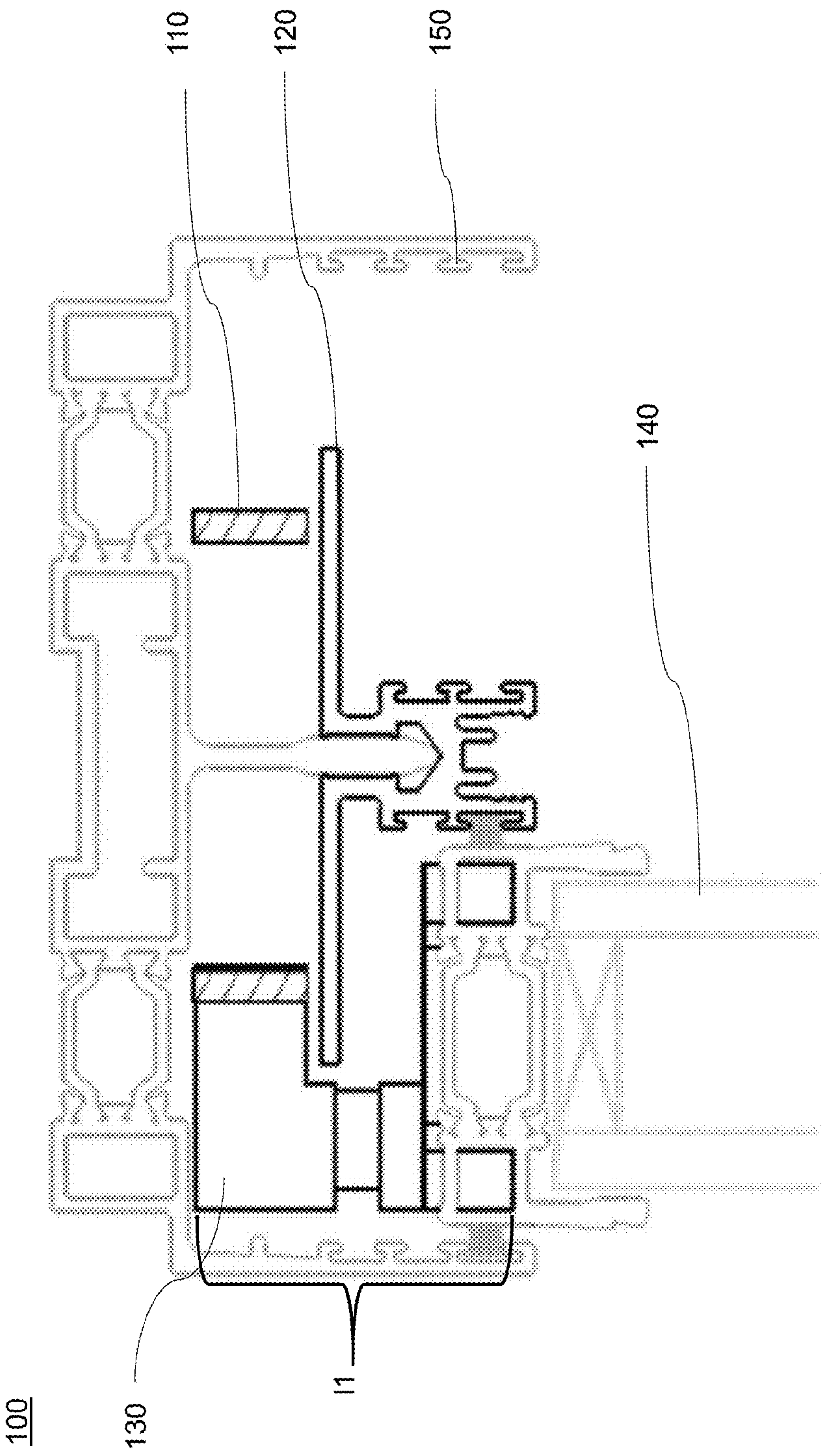
FIG. 5 illustrates a cross-sectional view of the sliding system, according to one or more embodiments.

FIG. 5 illustrates a cross-sectional view of the sliding system 100, according to one or more embodiments. Specifically, in the example embodiment of FIG. 5, the connecting device 130 is in a first position and has a first length (l1).

According to embodiments, the first position may be a standard position. In this regard, "standard position" described herein may refer to a position of the connecting device 130 within the sliding system 110 in which the first portion 132 and the second portion 134 of the connecting device 130 do not move in relation to one another. In other words, in the standard position, the connecting device 130 does not have any vertical movement, indicating that there is no deflection or misalignment in the components of the sliding system 100 during the sliding operation.

Figure 6:
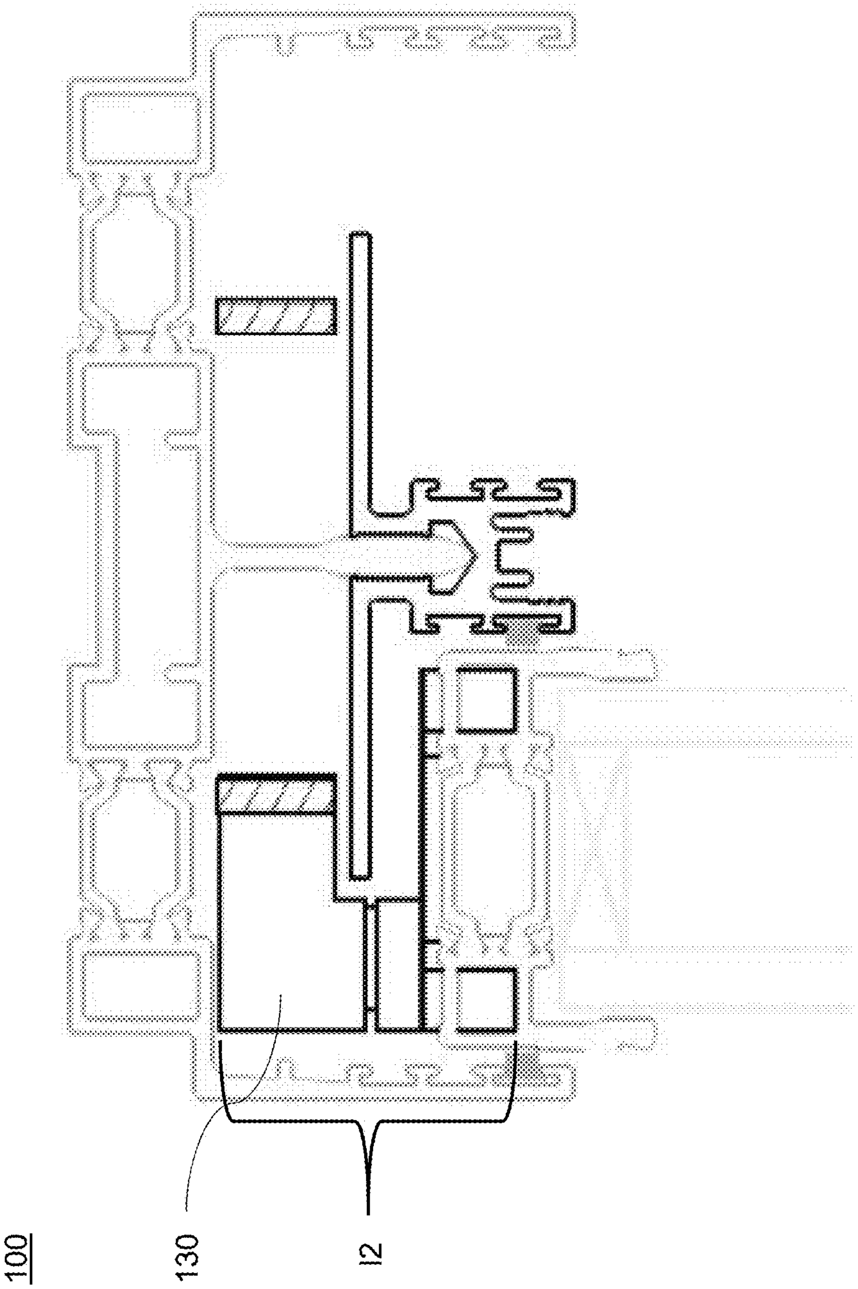
FIG. 6 illustrates another cross-sectional view of the sliding system, according to one or more embodiments.

FIG. 6 illustrates another cross-sectional view of the sliding system 100, according to one or more embodiments. Specifically, in the example embodiment of FIG. 6, the connecting device 130 is in a second position and has a second length (l2). The second position may be different from the first position in FIG. 5, and the second length may be different (e.g., shorter) than the first length.

According to embodiments, the second position may be a minimum position. In this regard, "minimum position" described herein may refer to a position of the connecting device 130 within the sliding system 110 in which the first portion 132 and the second portion 134 of the connecting device 130 move toward one another at its maximum availability (i.e., the connecting device 130 is in its minimum length), so as to compensate an amount of deflection or misalignment in the components of the sliding system 100 during the sliding operation.

Figure 7:
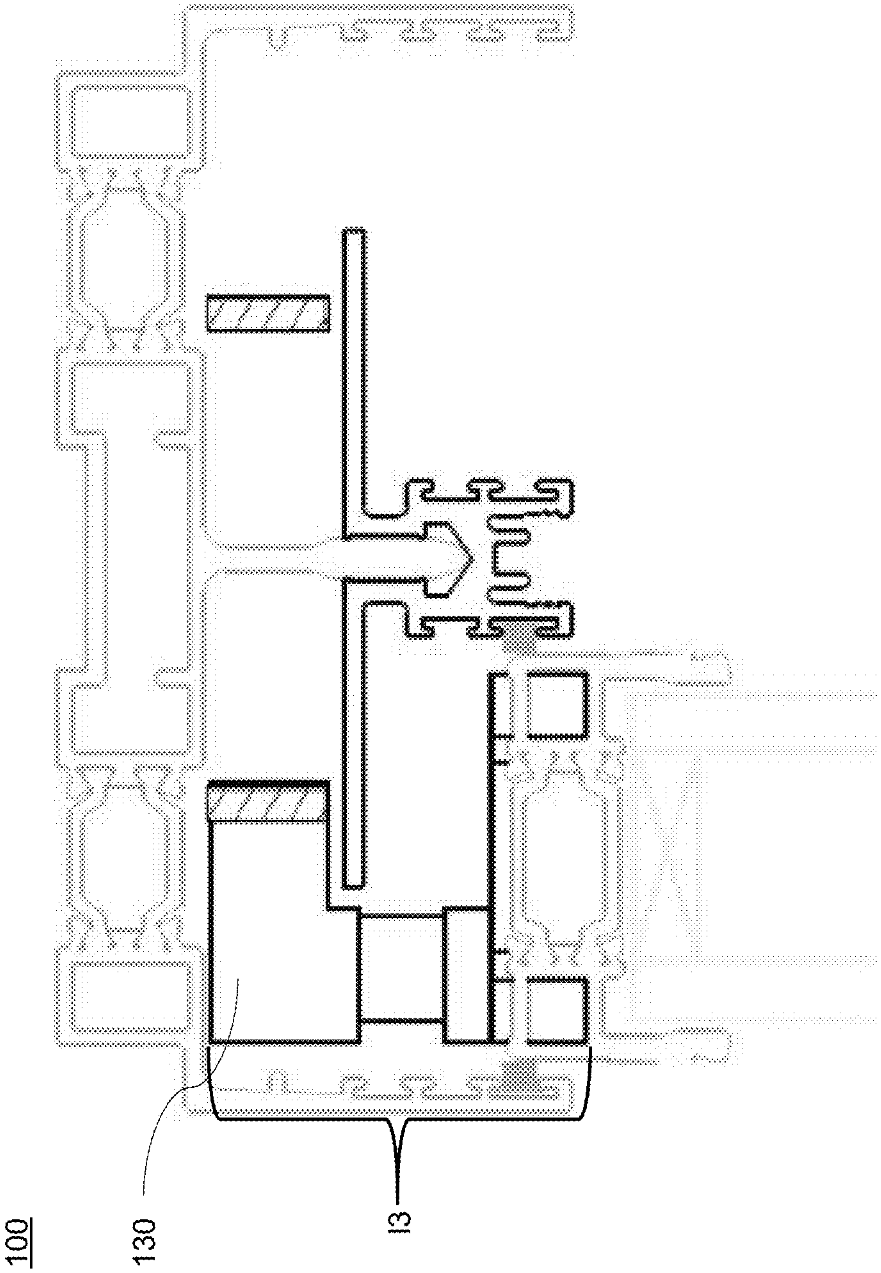
FIG. 7 illustrates another cross-sectional view of the sliding system, according to one or more embodiments.

FIG. 7 illustrates another cross-sectional view of the sliding system 100, according to one or more embodiments. Specifically, in the example embodiment of FIG. 7, the connecting device 130 is in a third position and has a third length (l3). The third position may be different from the first position in FIG. 5 and the second position in FIG. 6, and the third length may be different (e.g., longer) than the first length and the second length.

According to embodiments, the third position may be a maximum position. In this regard, "maximum position" described herein may refer to a position of the connecting device 130 within the sliding system 110 in which the first portion 132 and the second portion 134 of the connecting device 130 move away from one another at its maximum availability (i.e., the connecting device 130 is in its maximum length), so as to compensate an amount of deflection or misalignment in the components of the sliding system 100 during the sliding operation.

It is contemplated that the descriptions provided hereinabove are merely associated with potential embodiments of the present disclosure, and should not be construed as a limitation to the present disclosure. Specifically, other possible configuration, modification, equivalent replacement, or improvement made without departing from the spirit and principle of the present disclosure should be encompassed within the scope of the present disclosure.

Figure 8:
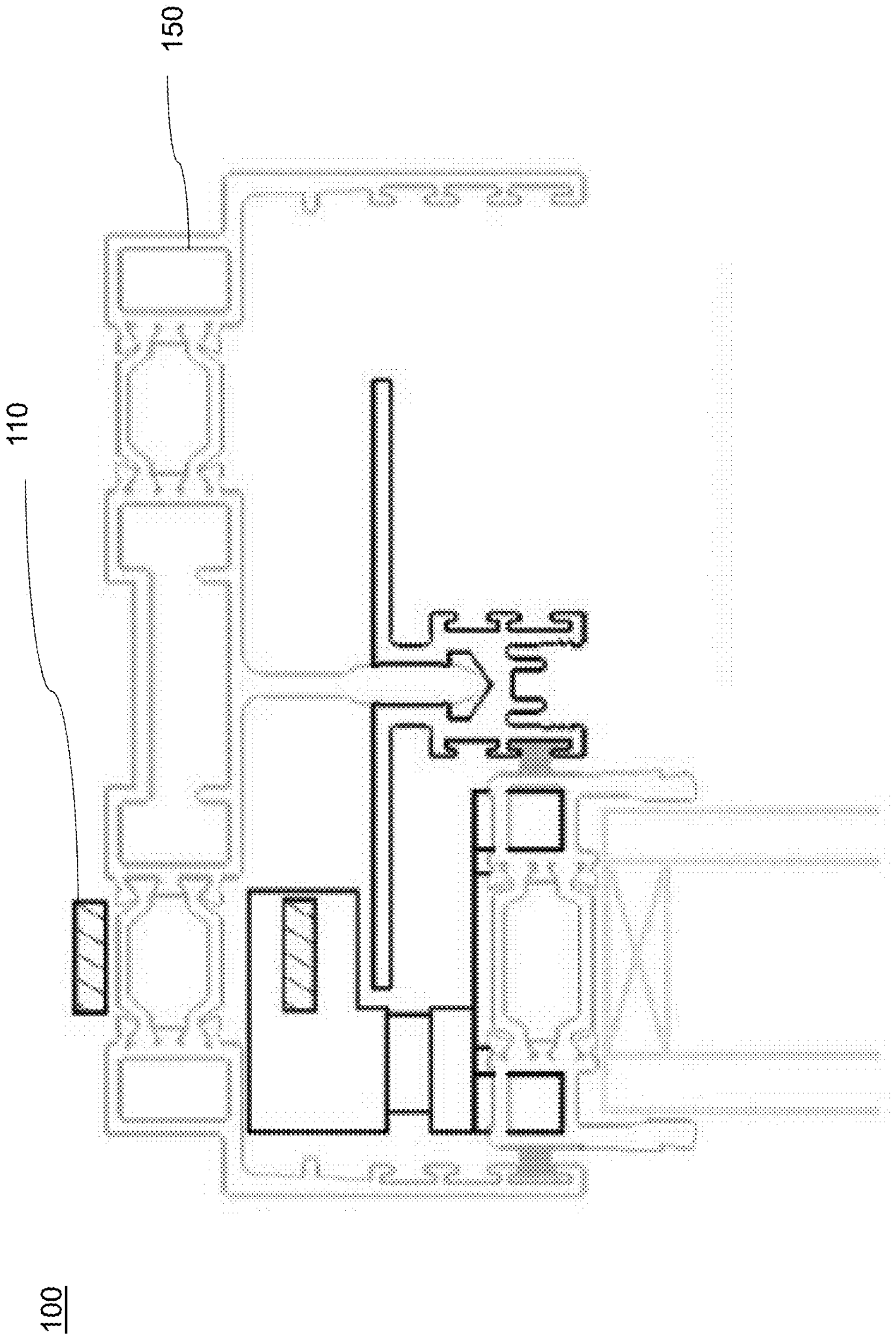
FIG. 8 illustrates a cross-sectional view of an alternative configuration of the sliding system, according to one or more embodiments.

For instance, the connecting device 130 may be in a fourth position and have a fourth length (14), and the like, in addition to those described in FIG. 5 to FIG. 7. Further, the number of tracks in the sliding system can be any suitable number. Furthermore, the drive mechanism 120 may also be arranged in a manner different from as illustrated in FIG. 1 to FIG. 7. For example, FIG. 8 illustrates a cross-sectional view of the sliding system 100, in which a portion of the drive mechanism 110 is disposed on top of the frame 150 (e.g., the belt 112 returns over the top of the frame 150, etc.)

In view of the above, example embodiments of the present disclosure provide a sliding system with improved drive mechanism. Specifically, the sliding system of the present disclosure includes a support device which provides continuous support to the drive mechanism and a connecting device which enables vertical movement between the sliding panel and the frame, thereby compensating deflection of the components in the sliding system during the sliding operation and mitigating any horizontal misalignment between the components.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A sliding system comprises:

a drive mechanism configurable to move a sliding panel along at least one track;

a frame housing at least a portion of the drive mechanism;

a supporting device detachably connected to the frame and providing horizontal support for the drive mechanism; and a connecting device detachably connecting the drive mechanism to the sliding panel to allow vertical movement therebetween by the connecting device any of lengthening and shortening by a deflection of deflectable first and second portions of the connecting device along each other as the sliding panel is moved along the at least one track.

2. The sliding system according to claim 1, wherein the connecting device comprises:

a first one of the deflectable first and second portions is attached to the drive mechanism; and a second one of the deflectable first and second portions is attached to the sliding panel, wherein the first one of the deflectable first and second portions is detachably connected to the second one of the deflectable first and second portions.

3. The sliding system according to claim 2, wherein:

the first one of the deflectable first and second portions comprises at least one female connector portion, and the second one of the deflectable first and second portions comprises at least one male connector portion.

4. The sliding system according to claim 2, wherein:

the first one of the deflectable first and second portions is movable in relation to the second one of the deflectable first and second portions when the connecting device is moved from a first position to a second position, and the connecting device has a first length at the first position and a second length at the second position.

5. The sliding system according to claim 2, wherein:

a part of the first one of the deflectable first and second portions is positioned between the frame and the supporting device.

6. The sliding system according to claim 2, wherein:

the drive mechanism comprises a plurality of pulleys and a belt wrapped around the plurality of pulleys, at least one of the plurality of pulleys and at least a portion of the belt are housed within the frame, and the first one of the deflectable first and second portions of the connecting device is attached to the belt.

7. The sliding system according to claim 2, wherein:

the drive mechanism comprises a plurality of pulleys and a belt wrapped around the plurality of pulleys, and at least one of the plurality of pulleys and at least a portion of the belt are mounted on top of the frame.

8. The sliding system according to claim 1, wherein:

the frame comprises a plurality of protruding portions, the supporting device comprises a receiving portion having a shape conforming the plurality of protruding portions of the frame, and the supporting device is detachably connected to the frame by inserting the plurality of protruding portions of the frame into the receiving portion of the supporting device.

9. The sliding system according to claim 1, wherein:

the sliding panel comprises one of: a door panel and a window panel.

10. The sliding system according to claim 1, wherein:

the supporting device is interposed both between the at least one track and the sliding panel.

11. The sliding system according to claim 1, wherein the deflection, of the deflectable first and second portions of the connecting device along each other as the sliding panel is moved along the at least one track, comprises a first one of the deflectable first and second portions any of inserting into and retracting from a second one of the deflectable first and second portions as the sliding panel is moved along the at least one track.

12. The sliding system according to claim 11, wherein the deflection further comprises the first one of the deflectable first and second portions any of inserting into and retracting from the second one of the deflectable first and second portions as the sliding panel is moved along the at least one track and with, along a direction of the vertical movement, part of the supporting device interposed between a part of the first one of the deflectable first and second portions and a part of the second one of the deflectable first and second portions as the sliding panel is moved along the at least one track.

13. The sliding system according to claim 1, wherein a first one of the deflectable first and second portions of the connecting device is, along a vertical direction, at a first side of the supporting device, a second one of the deflectable first and second portions of the connecting device is, along the vertical direction, at a second side of the supporting device, the first side of the supporting device is facing away from the frame and the drive mechanism, and the second side of the supporting device is facing towards the frame and the drive mechanism, the first one of the deflectable first and second portions is inserted into the second one of the deflectable first and second portions, by a connection spanning, along the vertical direction, from the first side of the supporting device to the second side of the supporting device, and the deflection of the deflectable first and second portions of the connecting device comprises the first one of the deflectable first and second portions being pressed into or released from being pressed into the second one of the deflectable first and second portions by force transmitted from the sliding panel to the deflectable first and second portions of the connecting device as the sliding panel is moved along the at least one track by the drive mechanism.

14. A sliding system comprises:

a drive mechanism configurable to move a sliding panel along at least one track, the drive mechanism comprises a plurality of pulleys and a belt wrapped around the plurality of pulleys;

a frame housing at least a portion of the drive mechanism, and at least a first one of the plurality of pulleys and at least a first portion of the belt are housed within the frame, a first portion of a connecting device is attached to the belt, and at least a second one of the plurality of pulleys and at least a second portion of the belt are mounted on top of the frame;

a supporting device detachably connected to the frame and providing horizontal support for the drive mechanism; and the connecting device detachably connecting the drive mechanism to the sliding panel to allow vertical movement therebetween.

15. A sliding system comprises:

a drive mechanism configurable to move a sliding panel along at least one track, the drive mechanism comprises a plurality of pulleys and a belt wrapped around the plurality of pulleys;

a frame housing at least a portion of the drive mechanism, and at least part of a first one of the plurality of pulleys and at least a first portion of the belt are housed within the frame, a first portion of a connecting device is attached to the belt, and at least part of a second one of the plurality of pulleys and at least a second portion of the belt are mounted on top of the frame;

a supporting device detachably connected to the frame and providing horizontal support for the drive mechanism; and the connecting device detachably connecting the drive mechanism to the sliding panel to allow vertical movement therebetween, the first portion is attached to the drive mechanism, and a second portion of the connecting device is attached to the sliding panel, wherein the first portion of the connecting device is detachably connected to the second portion of the connecting device.

* * * * *